United States Patent

Tokui

[11] Patent Number: 5,737,653
[45] Date of Patent: Apr. 7, 1998

[54] CAMERA CAPABLE OF MAGNETIC RECORDING

[75] Inventor: Masaki Tokui, Kanagawa-ken, Japan

[73] Assignee: Olympus Optical Co., Ltd., Tokyo, Japan

[21] Appl. No.: 710,089

[22] Filed: Sep. 10, 1996

Related U.S. Application Data

[63] Continuation of Ser. No. 294,270, Aug. 23, 1994, abandoned.

[30] Foreign Application Priority Data

Aug. 26, 1993 [JP] Japan .................. 5-211556

[51] Int. Cl.⁶ .................................................. G03B 17/24
[52] U.S. Cl. .................. 396/319; 396/320; 396/415; 396/440
[58] Field of Search ............................... 396/439, 440, 396/310, 319, 320, 415

[56] References Cited

U.S. PATENT DOCUMENTS

| | | | |
|---|---|---|---|
| 3,749,851 | 7/1973 | Nakamichi | 360/130.31 |
| 3,984,049 | 10/1976 | Shawen | 360/130.31 |
| 4,947,196 | 8/1990 | Wash et al. | 396/320 |
| 5,005,031 | 4/1991 | Kelbe | 354/106 |
| 5,097,278 | 3/1992 | Tamamura et al. | 354/105 |
| 5,272,498 | 12/1993 | Wakabayashi | 354/105 |
| 5,274,522 | 12/1993 | Taillie | 360/130.3 |
| 5,307,100 | 4/1994 | Kubo | 354/105 |

FOREIGN PATENT DOCUMENTS

| | | |
|---|---|---|
| 3-264934 | 11/1991 | Japan . |
| 4-352137 | 12/1992 | Japan . |

*Primary Examiner*—Eddie C. Lee
*Attorney, Agent, or Firm*—Frishauf, Holtz, Goodman, Langer & Chick

[57] ABSTRACT

A camera capable of magnetic recording includes a pressing pad for a magnetic head. The pressing pad is secured to the camera body and the head is made movable in order to increase the proximity of the head to the film and to enable reliable application to a low-cost, compact focal plane shutter camera. Above and below the aperture in the camera body, there are provided a pair of film rails and a pair of pressure plate rails formed so as to be higher than the film rails. An extended portion is formed on the film rail, and in the center of the extended portion, a recessed portion is made. A graded portion is formed to the left side of the extended portion, and a circular arc portion is formed to its left side. Below the pressure plate, there are provided a hole through which the magnetic head is secured to an actuating member with a mounting portion pressing the film, and a pair of stoppers for limiting the displacement of the magnetic head in the optical axis direction.

25 Claims, 5 Drawing Sheets

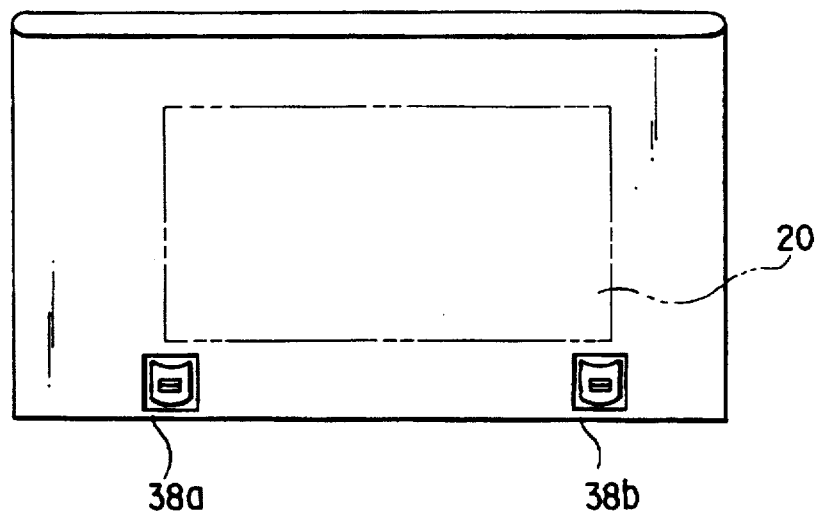
F I G. 7
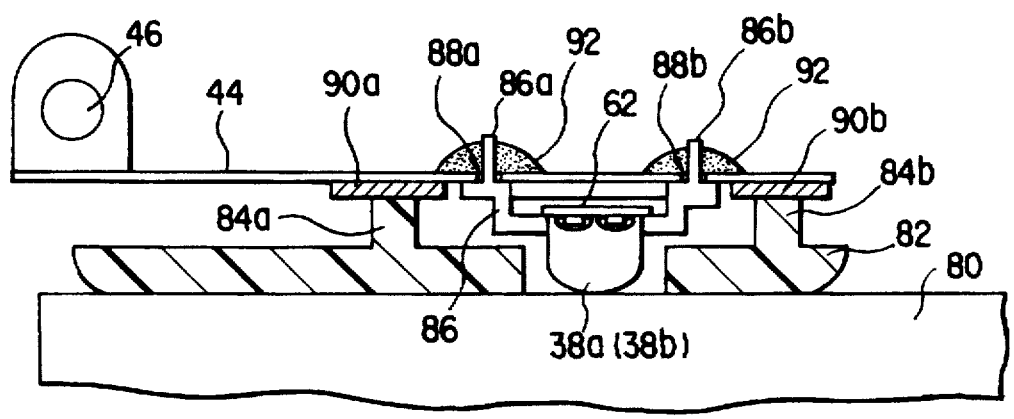
F I G. 8

CAMERA CAPABLE OF MAGNETIC RECORDING

This application is a Continuation of application Ser. No. 08/294,270, filed Aug. 23, 1994, now abandoned.

BACKGROUND OF THE INVENTION

1. Field of the Invention

This invention relates to a camera capable of magnetic recording, and more particularly to a camera capable of magnetic recording with an improved magnetic head-pressing mechanism.

2. Description of the Related Art

Recently, a variety of cameras capable of recording pictures onto magnetic recording sections of a film have been developed. For example, Jpn. Pat. Appln. KOKAI Publication No. 4-352137 has disclosed a camera in which a projecting portion is provided between the inside film rail and the outside pressure plate rail to decrease the gap between the magnetic head and the film caused by the film's tendency to curl, thereby improving the demagnetizing performance.

Furthermore, Jpn. Pat. Appln. KOKAI Publication No. 3-264934 has disclosed a camera in which an opening is made in the camera body facing the head to allow the head to press against the film and a solenoid or a motor is used to urge an elastic material. Traditionally, recorders have used a felt member to bring the film into contact with the head. In Jpn. Pat. Appln. KOKAI Publication No. 3-264934, however, use of an elastic material has been disclosed for the same purpose.

To magnetically read and write data from and onto a film, the gap between the magnetic head and the film must be in the range of several microns.

However, it is disclosed in Jpn. Pat. Appln. KOKAI Publication No. 4-352137 that the tip portion of the magnetic head is a projection flush with or lower than the pressure plate face. Normally, a tunnel clearance as great as a step of 0.2 mm is set between the film rail face and the pressure plate face. Since the thickness of a film is approximately 0.15 mm, a gap of approximately 0.05 mm is generally made, which varies with the type of film.

Although it is disclosed in Jpn. Pat. Appln. KOKAI Publication No. 4-352137 that the tip portion of the magnetic head is projected so as to be flush with the pressure plate face or to the extent that the flatness of the film is not ruined, an attempt to achieve a proximity accuracy of less than several microns as in magnetic recording and reproducing would prove to be impossible because of the reasons mentioned above. With the head being protruded so as to come into contact with the thinnest film, when a film thicker than that film is used, the film is caught by the projection of the head, damaging the magnetic layer of the film, and in the worst case, preventing the film from being fed.

By providing the head near the end of the screen (aperture) on the side of the take-up spool, photographic data can be recorded frame by frame in synchronism with the film feeding each time one frame is wound up, after the shooting for those frames has finished. In contrast, when the head is located away from the aperture, the position of the data item to be recorded shifts from the frame for which the subject has been shot. To record the data in the place corresponding to the photographed frame, the photographed data must be stored once and then recorded during rewinding, or what is called a prewind system, in which all of the film is completely wound around the spool before photography and shooting is done by rewinding the film frame by frame into the film cartridge, must be used and the magnetic head be placed near the exit of the film cartridge. However, placing the magnetic head near the aperture enables magnetic recording with a simple configuration.

The camera disclosed in Jpn. Pat. Appln. KOKAI Publication No. 3-264934 has a magnetic head placed near the aperture. In a camera using a focal plane shutter, it is impossible to make an aperture in the camera body and design a pressure pad to be movable because it overlaps with the moving range of the shutter blades of the shutter unit placed closer to the lens than the aperture of the camera body.

Furthermore, the camera in Jpn. Pat. Appln. KOKAI Publication No. 3-264934 has the pressing mechanism provided partially inside the camera body. As a result, its construction is complex and its driving mechanism needs a lot of space, thus increasing costs.

SUMMARY OF THE INVENTION

The object of the present invention is to provide a camera capable of magnetic recording with an improved proximity accuracy which can be applied to a low-cost, compact camera with a focal plane shutter unit without damaging the magnetic layer of a film and affecting the feeding of a film.

According to an aspect of the present invention, there is provided a camera capable of magnetic recording, comprising: a magnetic head actuated almost perpendicularly to a magnetic recording portion of a film toward a pressure plate; a recessed portion which is provided so as to face the magnetic head with the film between itself and the magnetic head and which has at least a wall portion flush with the face of a film rail in height in the optical axis direction; and an elastic slidable member which is provided in the recessed portion so as to be almost as tall as the wall portion and which lessens the advance resistance of the film and the contact pressure of the magnetic head when the magnetic head records or reads magnetic information onto or from the magnetic recording portion.

According to another aspect of the present invention, there is provided a camera using a film provided with a magnetic recording portion, comprising: a magnetic head for writing or reading information onto or from the magnetic recording portion on the back side of the camera; a magnetic head facing portion formed so as to be almost flush with the rail face determining the feeding face of the film in a position facing the magnetic head on the camera body side; a recessed portion provided in the magnetic head facing portion; and a slidable, elastic pad which is placed in the recessed portion to lessen the advance resistance of the film and the contact pressure of the magnetic head and which is at least flush with the facing portion.

According to still another aspect of the present invention, there is provided a camera using a film provided with a magnetic recording portion, comprising: a magnetic head for writing or reading information onto or from the magnetic recording portion on the back side of the camera; a pad which is placed in a position facing the magnetic head on the camera body side, and which is composed of a flexible slidable member and an elastic member in order to lessen the advance resistance and the contact pressure of the magnetic head when the film is fed with the magnetic head in contact with the magnetic recording portion; and a pad supporting portion which is formed between a film rail face and a pressure rail face provided above and below an exposure opening in the camera body so as to surround and support the pad, and which is almost flush with the rail face determining the feeding face of the film.

In the camera capable of magnetic recording of this invention, the magnetic head section is movable, and the pressing pad is made up of a film receiving portion around which rail faces are extended with a recessed portion in its center, in which a pressing member made of an elastic member and a slidable member are provided. Specifically, part of the film rail is extended toward a portion facing the magnetic head, and a recessed portion is provided in the extended portion facing the center portion in order to allow the magnetic head to record and read. Stuck to the recessed portion are a flexible slidable material, such as a Teflon sheet (Teflon is the trademark for polytetrafluoroethylene), which reduces the advance resistance during film feeding. The surface of the flexible slidable material is formed so as to be almost flush with the film rail face. Because the magnetic head is driven by an actuating member toward the film, the film can be caught between the flexible slidable member and the magnetic head, thereby maintaining the proximity.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is an explanatory diagram of a camera with two magnetic heads; and

FIG. 8 shows the state where the magnetic head of the second embodiment is pressed in a specified position against the film and held in place.

DETAILED DESCRIPTION OF THE PREFERRED EMBODIMENTS

Hereinafter, embodiments of the present invention will be explained.

Figure 1:
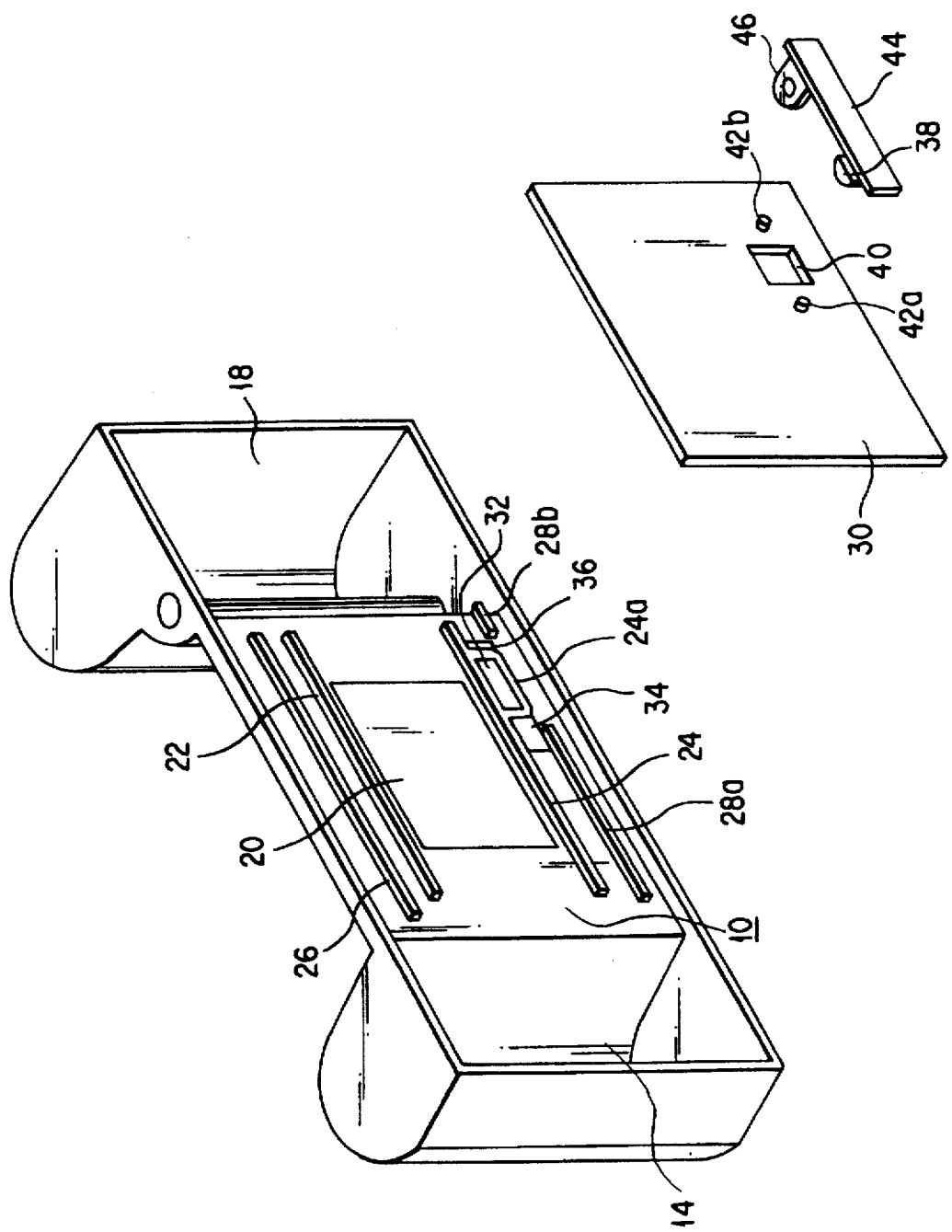
FIG. 1 is an overall perspective view of a camera capable of magnetic recording according to a first embodiment of the present invention.
Figure 2:
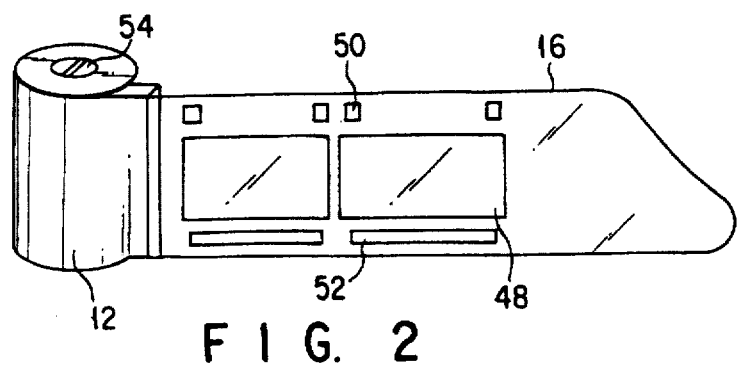
FIG. 2 is a view of a film loaded into the camera.

FIG. 1 is an overall perspective view of a camera capable of magnetic recording according to a first embodiment of the present invention. FIG. 2 is a view of a film loaded into the camera. In FIGS. 1 and 2, a camera body 10 is made up of parts formed of resin or by aluminum die casting, for example. In the camera body 10, a film cartridge compartment 14 for housing a specific film cartridge 12 and a take-up compartment 18 for taking up the film 16 fed from the film cartridge 12 are provided so as to sandwich an aperture 20 in the center of the body.

Above and below the aperture 20, there are provided film rails 22 and 24 for guiding a film (not shown in FIG. 1), pressure plate rails 26, 28a, and 28b in the longitudinal direction of the aperture 20. The pressure plate rails 26, 28a, and 28b are used to position a pressure plate 30 for guiding the film to the focal plane. The film rails 22 and 24 are formed so as to be approximately 0.2 mm lower than the pressure plate rails 26, 28a, and 28b in the optical axis direction. They are also designed to form a clearance (what is called a tunnel clearance) that allows the film to be movable and held in place on the focal plane without losing its flatness, when the pressure plate 30 is driven along the pressure plate rails 26, 28a, and 28b by an actuating spring (not shown).

The film rail 24 has an extended portion 24a that is extended toward the pressure plate rails 28a and 28b in a manner that forms a rectangle below the bottom right of the aperture 20. In the center of the extended portion 24a, a recessed portion 32 is made. In FIG. 1, a graded portion 34 is formed to the left of the extended portion 24a, and a circular arc portion 36 is formed to its right. These graded portion 34 and circular arc portion 36 will be explained later.

The pressure plate rails 28a and 28b are provided separately on both sides of the extended portion 24a of the film rail 24.

In the lower part of the pressure plate 30, there are a hole 40 through which the magnetic head 38 presses the film and stoppers 42a and 42b acting as a position limiting section for limiting the displacement of the magnetic head 38 in the optical axis direction. The magnetic head 38 is secured to an actuating or urging member 44, such as a leaf spring. On the actuating member 44, a mounting section 46 for actuation is provided.

The film 16 fed from the film cartridge 12 is constructed as shown in FIG. 2, for example. Specifically, a plurality of perforations 50 are provided above the photographic screen portion 48 of the film 16, below which a magnetic recording section 52 is provided. The magnetic head 38 faces the magnetic recording section 52 so as to record and read various pieces of information onto and from the magnetic recording section 52. Numeral 54 indicates the spool of the film cartridge.

Figure 3A:
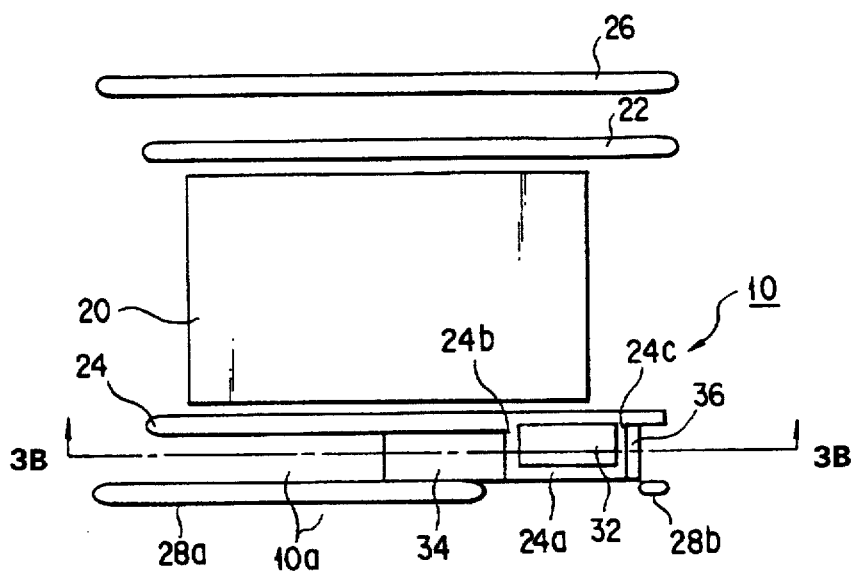
FIG. 3A is a view of the aperture 20 in FIG. 1 and its periphery.
Figure 3B:
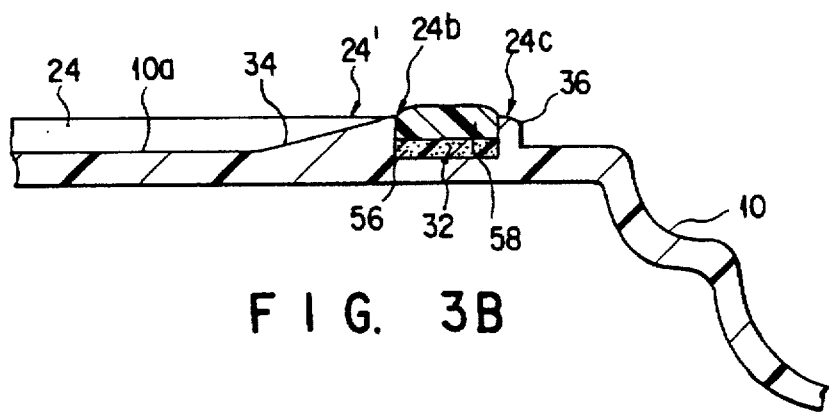
FIG. 3B is a sectional view taken along line 3B—3B of FIG. 3A.

FIG. 3A is a view of the aperture 20 in FIG. 1 and its periphery. FIG. 3B is a sectional view taken along line 3B—3B of FIG. 3A.

In the camera body 10, the face 24' of the film rail 24 and the faces 24b and 24c on both sides of the extended portion 24a are fabricated so that they may be flush with each other, or they are assembled and then milled on the basis of the mounting surface (not shown), as shown in FIG. 3B.

The recessed portion 32 in the center of the extended portion 24a is formed so as to be flush with or lower than the film rail 24 or the periphery 10a (FIGS. 3A and 3B) of the pressure rail 28a. The graded portion 34 has a slope with a specific angle running from the face 24b of the extended portion 24a to the periphery 10a. The circular arc portion 36 has a specific radius of curvature running from the face 24c of the extended portion 24a to the body 10, as shown in FIG. 3B.

To the inside of the recessed portion 32, an elastic material 56 of an expanded material, such as expanded urethane, and a highly slidable, flexible material, 58 such as Teflon, on the elastic material 56 are bonded with adhesive. The outer surface of the flexible material 58 is formed so as to be almost flush with the face 24' of the film rail 24. The flexible material 58 bends slightly when the magnetic head 38 presses the film 16 (the magnetic recording section 52), thereby increasing the proximity of the magnetic head 38 to the magnetic recording section 52. In addition, it is easy to bring the magnetic head 38 into contact with the magnetic recording section 52 for magnetic recording and reproduction, without precisely aligning the center of the magnetic head 28 with the position of the flexible material 58.

Figure 4:
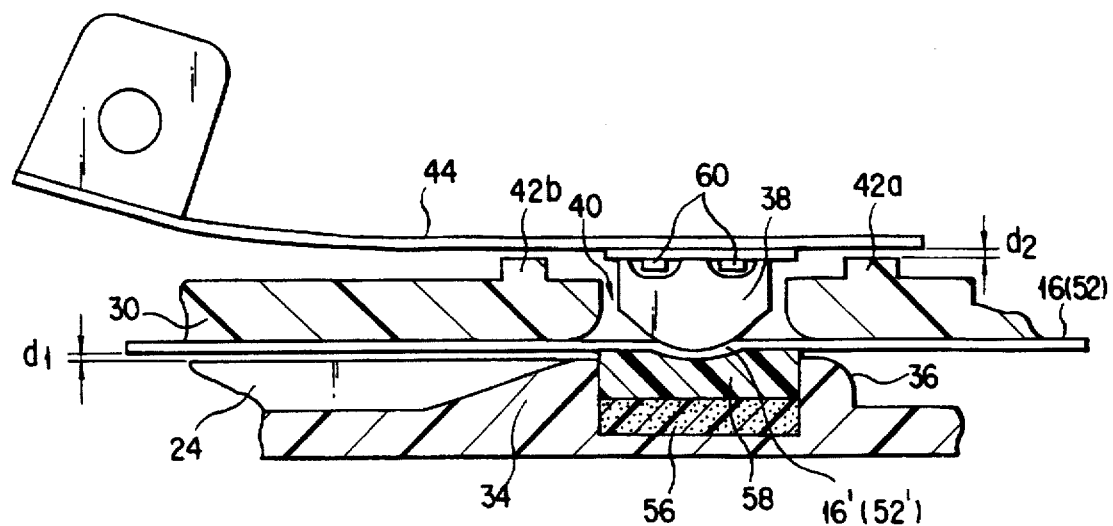
FIG. 4 shows the state in which the magnetic head 38 is pressed by the actuating member 44 against the film in the first embodiment.

FIG. 4 shows the state where the actuating member 44 brings the magnetic head 38 into contact with the film 16 in the embodiment.

As shown in FIG. 4, between the film rail 24 and the pressure plate 30, the film 16 (the magnetic recording section 52) is held with a clearance of $d_1$. The stoppers 42a and 42b provided on the pressure plate 30 limit the actuation of the actuating or urging member 44 toward the film 16. As mentioned earlier, the hole 40 is made in the pressure plate 30. The magnetic head 38 passes through the hole 40 and presses the film 16 downward in FIG. 4. The amount of contact pressure is controlled in advance so that the actuating or urging member 44 may come into contact with the stoppers 42a and 42b with a load of 3 g to 50 g. The magnetic head 38 is secured to the actuating member 44 so that it may stick nearly 0.02 to 0.4 mm out of the face of the pressure plate 30 on the side of the film 16, when the actuating member 44 comes into contact with the stoppers 42a and 42b.

Figure 5A:
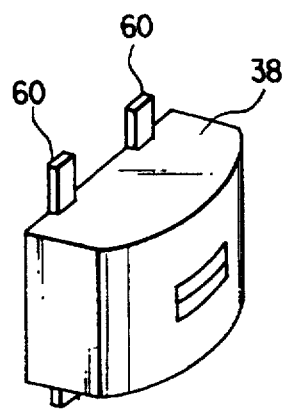
FIG. 5A shows an outward appearance of the magnetic head 38.

Furthermore, the magnetic head 38, whose terminal sections 60 shown in FIG. 5A are soldered to a flexible printed circuit board, is bonded to the actuating member 44. The structure of the magnetic head 38 is the same as that of the magnetic recording/reproducing head disclosed in Japanese Patent Application No. 4-227558. Specifically, the head 38 is flat and has the terminal sections 60 provided so as to extend in parallel with the plane of the film 16.

Figure 5B:
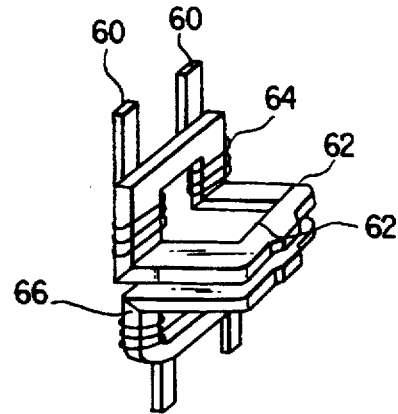
FIG. 5B shows the internal structure of the magnetic head 38 of FIG. 5A.

FIG. 5B shows the internal structure of the magnetic head 38 of FIG. 5A, which comprises of the terminal sections 60, cores 62, and coils 64. The cores 62 are made up of a material, such as permalloy, for forming a magnetic circuit. By joining the parts of the cores together at the graded portions 66, they can be formed into a flat shape.

In FIG. 4, when the magnetic head 38 presses the film 16, the film 16 (the magnetic recording section 52) bends slightly according to the preset amount of the protrusion of the magnetic head 38 and the elasticity of the flexible material 58 and the elastic material 56, and deforms as shown by 16' (52'). The expanded elastic material 56 absorbs variations in the contact position of the magnetic head 38 and enhances the proximity of the film 16 to the head.

In the above-described embodiment, because the actuating member 44 allowing deformation is provided on the side of the magnetic head 38, and the elastic material 56 and the flexible material 58 are provided on the pressing side, not only can variations in the contact position be absorbed, but the magnetic head 38 and pressing member also can trace the film even if the film moves due to vibrations during feeding, thereby assuring a reliable magnetic recording and reproduction. It goes without saying that it is desirable from the viewpoints of film feeding and the protection of the film's magnetic layer that the amount of bend 16' in the contact portion of the film 16 should be set as small as possible.

In the first embodiment, a clearance of $d_2$ (see FIG. 4) is produced between the actuating or urging member 44 and the stoppers 42a and 42b of the pressure plate 30, thereby allowing the film 16 to be pressed or urged with a specified pressure.

As described above, in the first embodiment, because the proximity of the magnetic head to the film can be achieved stably, magnetic recording and reproduction can be effected very stably during film feeding.

Referring to FIGS. 6A through 8, a second embodiment of the present invention will be explained.

Figure 6A:
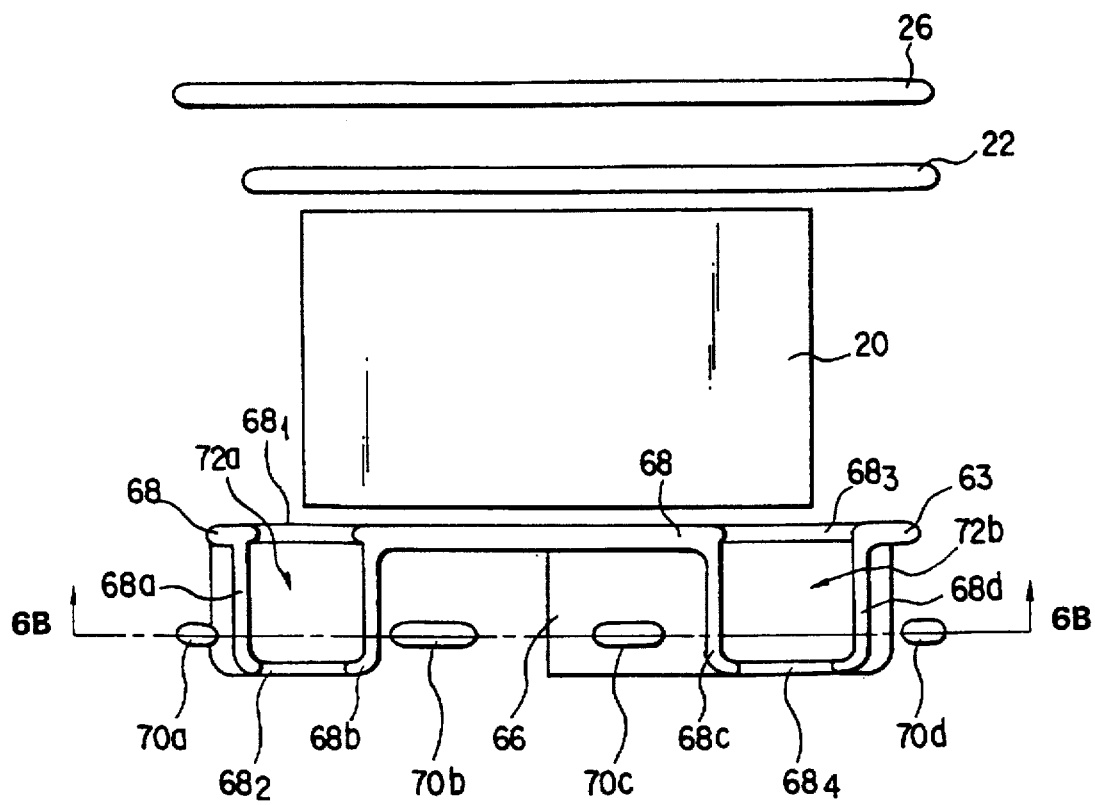
FIG. 6A is a view of an aperture in the camera body according to a second embodiment of the present invention and its periphery.
Figure 6B:
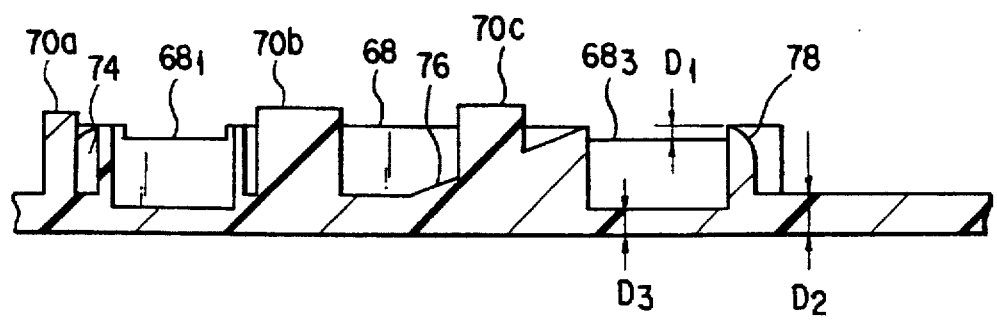
FIG. 6B is a sectional view taken along line 6B—6B of FIG. 6A.

FIG. 6A is a view of an aperture in the camera body according to a second embodiment of the present invention and its periphery. FIG. 6B is a sectional view taken along line 6B—6B of FIG. 6A. A film rail 22 and a pressure plate rail 26 are provided above an aperture 20 located almost in the center of the camera body 10. Below the aperture 20, there are provided a film rail 68 in the form shown in the figure and four pressure plate rails 70a to 70d formed into separate projections. The difference in height in the optical axis direction between the plane of the pressure plate rails 70a to 70d and the plane of the film rail 68 is such that a tunnel clearance is produced which allows the film to be fed without ruining its flatness.

While in this embodiment, the pressure plate rails 70a to 70d are formed into four separate projections, the pressure plate rails 70b and 70c may be formed integrally.

The film rail 68 comprises four extended portions 68a, 68b, 68c, and 68d, which are extended perpendicularly to the direction in which the film advances, and guide portions $68_1$, $68_2$, $68_3$, and $68_4$, which are parallel to the film advance direction. These guide portions $68_1$ to $68_4$ are formed so as to be $D_1$ lower than the remaining portions of the film rail 68, as shown in FIG. 6B. Recessed portions 72a and 72b are made in the portion enclosed by the extended portions 68a and 68b and guide portions $68_1$ and $68_2$ and the portion enclosed by the extended portions 68c and 68d and guide portions $68_3$ and $68_4$, respectively. As shown in FIG. 6B, these recessed portions 72a and 72b are formed so as to have a thickness of $D_3$ less than the thickness $D_2$ of the periphery of the film rail. The recessed portions 72a and 72b are formed so that their center may be located at the positions of the left and right ends of the aperture 20, respectively.

Around the extended portions 68a, 68c, and 68d and on the sides where the recessed portions 72a and 72b are not formed, a circular arc portion 74, a graded portion 76, and a circular arc portion 78 are formed as explained in the first embodiment. These circular arc portion 74, graded portion 76, and circular arc portion 78 enable the film to be fed smoothly without a hitch.

To the recessed portions 72a and 72b, an elastic material made of, for example, a sheet of expanded urethane, and a flexible resin are bonded with an adhesive or double-sided adhesive tape, as in the first embodiment. For example, they are a material obtained by laminating thin sheets of porous fluoroplastic into a flexible material containing air layers inside, or a material obtained by weaving and piling up fibrous resin, such as PTFE (polytetrafluoroethylene), to form a flexible material. The latter has a coefficient of friction less than 0.4 and is highly slidable.

The film, the positional relationship between the film and the magnetic head, and the operation are the same as those in the first embodiment (FIG. 4), and their explanation will be omitted.

In the second embodiment shown in FIGS. 6A and 6B, below the aperture 20, there are provided two similar recessed portions (72a, 72b), in which elastic materials and slidable materials are placed. This arrangement is intended for such a camera as has two magnetic heads (38a, 38b) as shown in FIG. 7.

Specifically, in FIGS. 6A and 6B, the film is fed to the position of the aperture 20 for preparation before taking a picture, the magnetic head 38a at the left in FIG. 7 is used to read the data unique to the film previously recorded on the film. After the feeding of the film has finished and the shooting preparation has completed, the exposure is effected. Then, the magnetic head 38b at the right records the photographic data and the previously set user information, etc. as the film advances.

FIG. 8 shows the state where the magnetic head used in the second embodiment is pressed at a specified position and held in place.

In FIG. 8, reference symbol 80 indicates an assembly table. A pressure plate 82 placed on the assembly table 80 has projecting portions 84a and 84b, which serve as a contact position limiting section. A head holder 86 is used to support the magnetic head 38a (38b). The magnetic head 38a is soldered to a board 62, which is then bonded to the head holder with an adhesive. The head holder 86 has two projecting portions 86a and 86b, which are inserted into holes 88a and 88b made in part of an actuating member 44. Reference symbols 90a and 90b indicate assembly spacers, and 92 represents an adhesive.

With such a configuration, the pressure plate 82 and the magnetic head 38a are placed on the assembly table 80 so as to be in contact with the latter. Then, between the projecting portions 84a and 84b formed on the pressure plate 82 and the actuating member 44, the assembly spacers 90a and 90b with a suitable thickness (preferably, t0.02 to t0.4) are inserted. In this state, the projecting portions 86a and 86b of the head holder 86 are secured with an adhesive 92.

After the adhesive 92 has hardened, the assembly spacers 90a and 90b are removed, and a mounting section 46 of the actuating member 44 is secured to the camera (not shown) so that the projecting portions 84a and 84b of the pressure plate 82 may make contact with the camera at a specified pressure. This allows the tip portion of the magnetic head 38a to stick out of the pressure plate 80 on the film surface side as much as the thickness of the assembly spacers 90a and 90b.

In the first and second embodiments, the magnetic head is adjusted so as to stick slightly out of the surface of the pressure plate on the film side, and the elastic material on the pressing side supports the magnetic head. Ideally, the surface of the flexible material should be flush with the surrounding film rail surface, from the viewpoint of film feeding. However, the present invention is characterized in that even if the surface of the flexible material is not flush with the film rail surface, magnetic recording and reproduction can be effected reliably. Specifically, because both the magnetic head side and the pressing slidable material side are constructed so as to be movable using an actuating member and an elastic material, even if the amount of protrusion of the magnetic head varies due to assembly conditions, the pressing slidable material side can change as much as the magnetic head comes into contact with the film.

Furthermore, when the amount of protrusion of the magnetic head from the pressure plate is made greater to make the film come much closer to the magnetic head for higher density recording, the surface position of the slidable member can, of course, be set slightly lower than the film rail surface accordingly. The setting can be done according to the feeding resistance on the basis of the specification of magnetic recording and reproduction, thereby providing the design with high flexibility.

While in the embodiments, the film pressing side is composed of an expanded elastic material and a flexible slidable material, it is not necessarily made up of an expanded elastic material. It may be composed of a different material as long as it has a similar elasticity. In addition, when the slidable material is an elastic material with a small coefficient of friction, such as Teflon, the pressing section is not necessarily divided into two parts, but may be formed into a single unit.

With the present invention, the film is allowed to come into contact with the magnetic head stably by means of a simple configuration. Additionally, because a pressing pad is formed using only a recessed portion, without making an opening in the camera body, magnetic recording can be effected at low cost even with an SLR equipped with a focal plane shutter. Furthermore, even with a camera using a focal plane shutter, a magnetic head can be placed near the aperture.

Because both the magnetic head and the pressing member are provided with actuating means, accurate magnetic recording and reproduction can be effected even if the position of the head varies. Furthermore, since elasticity is given to both the magnetic head and the pressing portion, they can follow the film more effectively, thereby making it possible to write with high density. Additionally, because the periphery of the pressing pad is made flush with the film rail surface for assuring the flatness of the film, they can be machined at the same time, thereby achieving the stable dimensions of the workpiece.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera capable of performing magnetic recording with respect to a film having a magnetic recording section, the camera comprising:

a magnetic head;

a pressure plate having a hole through which the magnetic head is brought into contact with the magnetic recording section of the film;

an urging member for securing the magnetic head and for pressing the magnetic head through the hole in the pressure plate and against the magnetic recording section of the film at all times;

a recessed portion provided at a position which faces the magnetic head, with the film interposed between the recessed portion and the magnetic head, said recessed portion including a portion which is flush with a face of a film rail in height in an optical axis direction;

an elastic slidable member provided within said recessed portion; and a graded portion including a sloped surface having a height in the optical axis direction which gradually decreases from the height of the recessed portion which is flush with the face of the film rail, said sloped surface being on a film feeding side of the recessed portion so as to prevent the film from becoming stuck as the film is fed; and wherein, when magnetic information is recorded in the magnetic recording section or read out from the magnetic recording section by the magnetic head, a pressure with which the magnetic head is pressed against the magnetic recording section is controlled and a film running resistance is reduced by cooperation between said urging member securing the magnetic head and said elastic slidable member provided within the recessed portion, irrespective of a position which the magnetic head takes relative to the pressure plate.

2. A camera according to claim 1, wherein said elastic slidable member comprises an elastic member formed of an expanded material and a flexible slidable member.

3. A camera according to claim 2, wherein said elastic member is arranged at a bottom portion of said recessed portion, and said flexible slidable member is arranged on a top portion of said elastic member.

4. A camera according to claim 2, wherein said elastic member is arranged at a bottom portion of said recessed portion, and said flexible slidable member comprises a flexible slidable member of a fluoride series and is arranged on a top portion of said elastic member.

5. A camera according to claim 1, wherein said pressure is controlled by said urging member and said elastic slidable member so as to be within a predetermined range.

6. A camera according to claim 1, wherein said urging member is separate from said pressure plate.

7. A camera capable of performing magnetic recording with respect to a film having a magnetic recording section, the camera comprising:

a magnetic head for writing or reading information onto or from said magnetic recording section of the film, said magnetic head being at a backside of the camera;

a pressure plate having a hole through which the magnetic head is brought into contact with the magnetic recording section of the film;

an urging member for securing the magnetic head and for pressing the magnetic head through the hole in the pressure plate and against the magnetic recording section of the film at all times;

a recessed portion provided at a position which faces the magnetic head, with the film interposed between the recessed portion and the magnetic head, said recessed portion including a portion which is flush with a face of a film rail in height in an optical axis direction;

a graded portion including a sloped surface having a height in the optical axis direction which gradually decreases from the height of the recessed portion which is flush with the face of the film rail, said sloped surface being on a film feeding side of the recessed portion so as to prevent the film from becoming stuck as the film is fed; and a slidable, elastic pad, provided in said recessed portion, for reducing a resistance which the film may undergo when the film is advanced, and for reducing a pressure with which said magnetic head is pressed against the film; and wherein, when magnetic information is recorded in the magnetic recording section or read out from the magnetic recording section by the magnetic head, the magnetic head is pressed against the film by means of sliding and elastic characteristics of said pad and also responsive to an urging force of the urging member, such that a pressure exerted on the magnetic head is not excessive, thereby reducing a film running resistance.

8. A camera according to claim 7, wherein said pad comprises an elastic material and a flexible slidable material.

9. A camera according to claim 7, further comprising:

a body with an exposure opening;

an upper film rail formed above the exposure opening;

a lower film rail formed below the exposure opening;

an upper pressure plate rail formed above the exposure opening; and a lower pressure plate rail formed below the exposure opening; and wherein:

said recessed portion is formed between said lower film rail and said lower pressure plate rail.

10. A camera according to claim 7, wherein said pressure exerted on said magnetic head is controlled by said urging member and said pad to be within a predetermined range.

11. A camera according to clam 7, wherein said urging member is separate from said pressure plate.

12. A camera using a film having a magnetic recording portion, the camera comprising:

a magnetic head for writing or reading information with respect to the magnetic recording portion of the film;

an urging member for securing the magnetic head and for urging the magnetic head into contact with the film at all times;

a pad arranged at a position facing said magnetic head on a camera body side, said pad comprising a flexible slidable member and an elastic member and being arranged to lessen an advancing resistance of the film and to lessen a contact pressure of the magnetic head against the film when the film is fed, with the magnetic head being kept in contact with the magnetic recording portion of the film; and a pad supporting portion formed between a film rail face and a pressure rail face provided above and below an exposure opening in the camera body so as to surround and support said pad, said pad supporting portion being flush with a rail face defining a feeding face of the film;

a graded portion including a sloped surface having a height in an optical axis direction which gradually decreases from that of the said pad supporting portion flush with said rail face, said sloped surface being on a film feeding side of said pad supporting portion so as to prevent the film from becoming stuck as the film is fed; and wherein, when magnetic information is recorded in the magnetic recording portion or read out from the magnetic recording portion by the magnetic head, the magnetic head is moved by cooperation between said pad and said urging member to control a pressure exerted on the magnetic head, thereby reducing a film running resistance.

13. A camera according to claim 12, wherein said pressure exerted on said magnetic head is controlled to be within a predetermined range.

14. A camera capable of performing magnetic recording with respect to a film having a magnetic recording section, the camera comprising:

an urging member for securing the magnetic head to a camera body of the camera and for pressing the magnetic head against the film at all times;

a recessed portion provided at a position of the camera body facing the magnetic head, with the film located between the recessed portion and the magnetic head;

an elastic slidable member provided in the recessed portion; and a graded portion including a sloped surface having a height in an optical axis direction which gradually decreases from the elastic slidable member, said sloped surface being on a film feeding side of the recessed portion so as to prevent the film from becoming stuck as the film is fed; and wherein, when magnetic information is recorded in the magnetic recording section or read out from the magnetic recording section by the magnetic head, a pressure with which the magnetic head is pressed against the magnetic recording section is controlled by said urging member securing the magnetic head and said elastic slidable member provided within said recessed portion.

15. A camera according to claim 14, wherein said pressure is controlled by said urging member and said elastic slidable member to be within a predetermined range.

16. A camera capable of performing magnetic recording with respect to a film having a magnetic recording section, the camera comprising:

an urging member for pressing the magnetic head against the film with a predetermined pressure at all times; and an elastic slidable member provided at a position facing the magnetic head, with the film located between the elastic slidable member and the magnetic head;

a graded portion including a sloped surface having a height in an optical axis direction which gradually decreases from that of the elastic slidable member, said sloped surface being on a film feeding side of said elastic slidable member so as to prevent the film from becoming stuck as the film is fed; and wherein the magnetic head is adjusted in position to control a pressure-related friction force which is exerted on the magnetic recording section and which is due to pressure transmitted from the magnetic head urged by said urging member and a reaction transmitted from the elastic slidable member, to thereby reduce a film running resistance.

17. A camera according to claim 16, wherein the magnetic head is adjusted in position to control said pressure to be within a predetermined range.

18. A camera using a film having a magnetic recording portion, the camera comprising:

a magnetic head for writing or reading information onto or from the magnetic recording portion of the film;

an urging member for securing the magnetic head and for urging the magnetic head into contact with the film at all times;

a pad arranged at a position facing said magnetic head on a camera body side, with the film interposed between said pad and said magnetic head, said pad comprising a flexible slidable member and an elastic member and said pad being arranged to lessen an advancing resistance of the film and to lessen a contact pressure of the magnetic head against the film when the film is fed, with the magnetic head being kept in contact with the magnetic recording portion of the film;

a graded portion including a sloped surface having a height in an optical axis direction which gradually decreases from the flexible slidable member, said sloped surface being on a film feeding side of said flexible slidable member so as to prevent the film from becoming stuck as the film is fed; and wherein, when magnetic information is recorded in the magnetic recording portion or read out from the magnetic recording portion by the magnetic head, the magnetic head is moved by cooperation between said pad and said urging member to control a pressure exerted on the magnetic head, thereby reducing a film running resistance.

19. A camera using a film having a magnetic recording portion, the camera comprising:

a magnetic head for writing or reading information onto or from the magnetic recording portion of the film;

an urging member for securing the magnetic head and for urging the magnetic head into contact with the film at all times;

a pad arranged at a position facing said magnetic head on a camera body side, with the film interposed between said pad and the magnetic head, said pad comprising a flexible slidable member and an elastic member and being arranged to lessen an advancing resistance of the film and to lessen a contact pressure of the magnetic head against the film when the film is fed, with the magnetic head being kept in contact with the magnetic recording portion of the film;

a pad supporting portion formed between a film rail face and a pressure rail face provided above and below, respectively, an exposure opening in the camera body so as to surround and support said pad, said pad supporting portion having a portion which is flush with a rail face defining a feeding face of the film; and a graded portion including a sloped surface having a height in an optical axis direction which gradually decreases from that of said film rail face, said sloped surface being on a film feeding side of said pad supporting portion so as to prevent the film from becoming stuck as the film is fed; and wherein, when magnetic information is recorded in the magnetic recording portion or read out from the magnetic recording portion by the magnetic head, the magnetic head is moved by cooperation between said pad and said urging member to control a pressure exerted on the magnetic head, thereby reducing a film running resistance.

20. A camera according to claim 19, wherein said pad comprises an elastic material portion and a flexible slidable material portion said flexible slidable material portion being arranged to contact the film.

21. A camera which uses a film having a magnetic recording section, the camera comprising:

a magnetic head adapted to be brought into contact with the film, for recording or reading magnetic information on or from the magnetic recording section of the film while in contact with the film;

a contact member, arranged opposite to said magnetic head, which is brought into contact with the film so that the film is in contact with said magnetic head at all times;

a first elastic member for bringing said magnetic head into contact with the film;

a second elastic member for bringing said contact member into contact with the film; and a graded portion including a sloped surface having a height in an optical axis direction which gradually decreases from the contact member, said sloped surface being on a film feeding side of said contact member so as to prevent the film from becoming stuck as the film is fed.

22. A camera according to claim 21, wherein said first elastic member is made of a plate spring.

23. A camera according to claim 21, wherein said second elastic member is made of foam urethane.

24. A camera according to claim 21, wherein said contact member is made of polytetrafluoroethylene (PTFE).

25. A camera according to claim 21, wherein:

said first elastic member urges said magnetic head into contact with a surface portion on one side of the film; and said second elastic member urges said contact member into contact with a surface portion of an opposite side of the film.

* * * * *